United States Patent
No et al.

(10) Patent No.: US 11,023,428 B2
(45) Date of Patent: *Jun. 1, 2021

(54) FORM FIELD CREATION SYSTEMS AND METHODS

(71) Applicant: salesforce.com, inc., San Francisco, CA (US)

(72) Inventors: Jamie No, Mill Creek, WA (US);
Michelle Jowitt, Oakland, CA (US);
Eugene Li, Saratoga, CA (US);
Theresa Vietvu, Sunnyvale, CA (US);
Carol Franger, Berkeley, CA (US)

(73) Assignee: salesforce.com, inc., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/655,060

(22) Filed: Oct. 16, 2019

(65) Prior Publication Data
US 2020/0050592 A1 Feb. 13, 2020

Related U.S. Application Data

(63) Continuation of application No. 14/537,297, filed on Nov. 10, 2014, now Pat. No. 10,482,070.

(60) Provisional application No. 61/903,247, filed on Nov. 12, 2013.

(51) Int. Cl.
*G06F 16/21* (2019.01)
(52) U.S. Cl.
CPC .................................. *G06F 16/21* (2019.01)

(58) Field of Classification Search
CPC ........................................................ G06F 17/24
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |

(Continued)

*Primary Examiner* — James J Debrow
(74) *Attorney, Agent, or Firm* — LKGlobal | Lorenz & Kopf, LLP (57) ABSTRACT

A method for creating a field database object (DO) in a database system (DS) is provided. Prior to run-time: a first page associated with the DO is displayed via a user interface (UI) presented on a display device (DD); a request to create a field for the DO is received via the UI presented on the DD; field creation options for creating fields for the DO within the first page are displayed via the UI; a selection of one or more field creation options is received via the UI and communicated to the DS; and the field is created in the DS. During run-time, the DD is sent a second page to be displayed that is different than the first page, via the same UI presented on the DD that was displayed and used to receive the selection used to create the field using the first page.

20 Claims, 5 Drawing Sheets

(56) References Cited

U.S. PATENT DOCUMENTS

| | | |
|---|---|---|
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 7,730,478 B2 | 6/2010 | Weissman |
| 7,779,475 B2 | 8/2010 | Jakobson et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2002/0188703 A1* | 12/2002 | Alden ............. G06F 15/177 |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0223022 A1* | 10/2005 | Weissman et al. ........ G06F 7/00 |
| 2006/0021019 A1 | 1/2006 | Hinton et al. |
| 2008/0249972 A1 | 10/2008 | Dillon |
| 2009/0063414 A1 | 3/2009 | White et al. |
| 2009/0100342 A1 | 4/2009 | Jakobson |
| 2009/0177744 A1 | 7/2009 | Marlow et al. |
| 2011/0184870 A1* | 7/2011 | Angel etal. ............. G06F 3/048 |
| 2011/0247051 A1 | 10/2011 | Bulumulla et al. |
| 2012/0042218 A1 | 2/2012 | Cinarkaya et al. |
| 2012/0218958 A1 | 8/2012 | Rangaiah |
| 2012/0233137 A1 | 9/2012 | Jakobson et al. |
| 2013/0145348 A1* | 6/2013 | Agovic etal. ........... G06F 17/30 |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |

* cited by examiner

FORM FIELD CREATION SYSTEMS AND METHODS

CROSS-REFERENCE TO RELATED APPLICATIONS

This application is a Continuation of U.S. application Ser. No. 14/537,297, filed Nov. 10, 2014, which claims priority to U.S. Provisional Application No. 61/903,247, filed Nov. 12, 2013, the contents of which are hereby incorporated by reference.

TECHNICAL FIELD

Embodiments of the subject matter described herein relate generally to computer database systems, and more particularly, to methods and systems for creating form fields for web pages and the like in the context of computer database systems.

BACKGROUND

Database systems may provide a variety of user interfaces for accessing and modifying stored data, which may be organized and formatted in any number of ways, e.g., as a relatively small number of large data tables (or "objects") having a variety of data fields. These data fields are presented to the user on a page (e.g., a web page), allowing the user to enter and modify data in a convenient manner.

The creation of new object fields in such a database typically requires use of back-end database design tools, such as a multi-step "wizard" or the like, which presents the fields in a way that is much different, visually, from the way those fields are ultimately rendered on the page during run-time (e.g., during normal operation). That is, the user-interface provided for creating new fields is typically much different from the user-interface provided for displaying those same fields during normal data entry tasks. Because the user must leave the run-time page to create new fields, the user cannot quickly visualize how those new fields will be displayed during run-time.

Accordingly, methods and systems are desired for improving the creation of form fields in such forms.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Embodiments of the subject matter described herein generally relate to improved systems and method for creating object fields in the context of database systems, for example, database systems accessible via a web-based user interface. As described in greater detail below, in accordance with exemplary embodiments, fields for database objects can be created within the same user interface that is used to display the fields during runtime—i.e., without requiring the user to change to a second user interface associated with a back-end design tool. In this way, the user is able to quickly and intuitively visualize the results of object field creation.

In accordance with one embodiment, a method includes displaying, via a user interface, a first page associated with the database object, and receiving, via the user interface, a request to create a field for the database object. A plurality of field creation options for the database object are then displayed, and a selection of at least one of the plurality of field creation options is received. The field for the database object in the database system is created based on the selection, and a second, modified page including the field for the database object is displayed via the user interface.

In accordance with one embodiment, an apparatus comprises a database system including a database object, and a computing device communicatively coupled thereto via a network. The computing device is configured to display, via a user interface, a first page associated with the database object; send, to the database system, a request to create a field for the database object; display a plurality of field creation options for the database object; and receive a selection of at least one of the plurality of field creation options. The database system is configured to create the field for the database object in the database system based on the selection; and the computing device is configured to display, via the user interface, a second page including the field for the database object.

Figure 1:
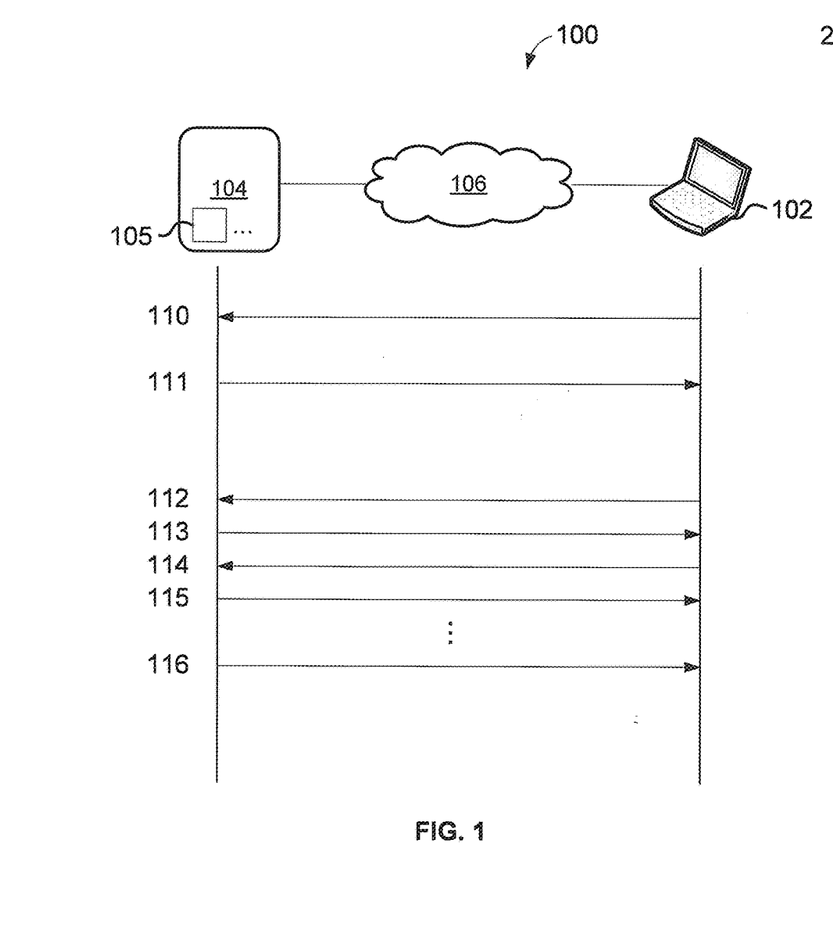
FIG. 1 is conceptual block diagram depicting a method of creating fields in accordance with one embodiment.

Referring now to the conceptual block diagram and signal flow depicted in FIG. 1, a system 100 in accordance with one embodiment generally includes a database system 104 having one or more database objects 105 stored therein, and a computing device (or simply "device") 102 communicatively coupled to database system 104 via, for example, a data communication network 106 (such as the Internet).

Database system 104 may be implemented using any suitable combination of hardware and software and may correspond to any of a variety of database system types, including, for example, a multi-tenant system as described in further detail below in connection with FIG. 8. Similarly, device 102 may be any combination of hardware and software configured to access database system 104 via network 106 and to provide a user interface (via a suitable display and input/output components) that allow a user to interaction with database system 104 and its objects 105. Device 102 may correspond, for example, to a desktop computer, a laptop computer, a tablet computer, a smart-phone, or the like.

Database object (or simply "object") 105 may include any combination of tables, schemas, and the like used to store and organize data in database system 104, as is known in the art. The nature of object 105 will typically vary depending on the particular purpose of database system 104. For example, in the context of a customer relationship management (CRM) system, object 105 may correspond to an "account" object, an "opportunity" object, a "contact" object, or the like. Regardless of its particular structure, object 105 will generally include a plurality of "fields." Such fields (sometimes referred to as "columns") reflect the manner in which object 105 and its records are organized. For example, if object 105 corresponds to a "contact" object, it might include individual fields for "name," "address," "e-mail address," etc. As described in further detail below, each field of object 105 may have a corresponding type, such as a text field, a checkbox field, a date field, etc.

Figure 2:
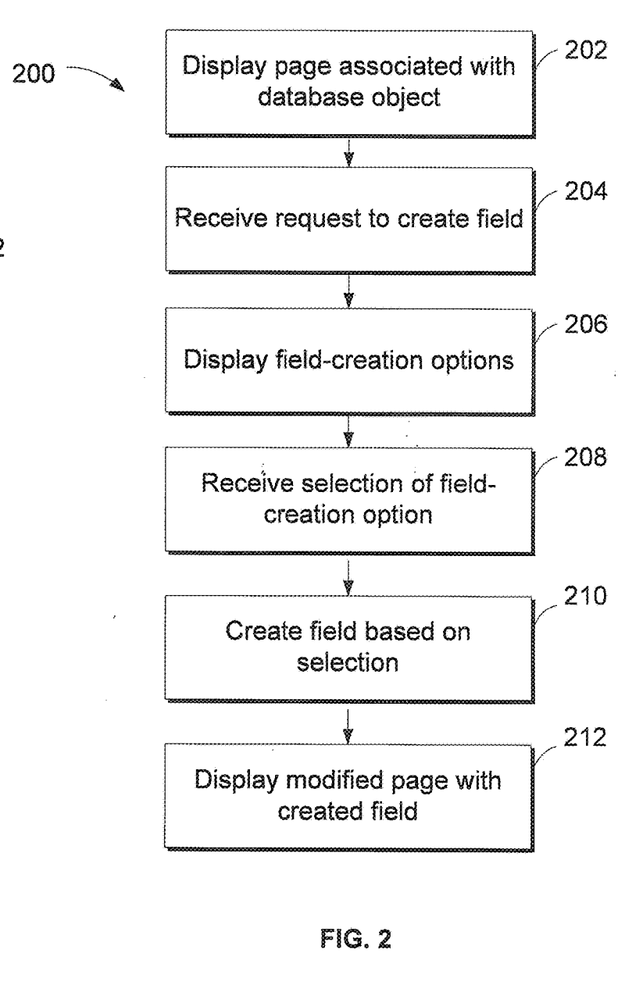
FIG. 2 depicts a multi-tenant system in accordance with one embodiment.

Referring now to the exemplary flowchart 200 of FIG. 2 and the conceptual block diagram of system 100 of FIG. 1, an exemplary method for creating a field for database object 105 will now be described.

First, at step 202, device 102 displays, via a user interface, a page associated with database object 105. The nature of such pages will be described further in connection with FIGS. 3-7; however, for the purpose of this example and without loss of generality the displayed page may be considered a web page rendered by a web browser running on device 102 using various HTML, CSS, and Javascript files as is known in the art. In FIG. 1, this step corresponds to a request 110 (e.g., an HTTP request for a web page), followed by a response 111 including the appropriate HTML and other code.

Next, at step 204, database system 104 receives a request 112 to create a field for database object 105, and database system 104 responds (113) accordingly. Request 113 may be made in a variety of ways. For example, request 113 may be the result of a user interacting with a particular user interface component (e.g., an HTML link or button) displayed by device 102. Request 113 might also be the result of the user selecting a "create field" option via a context menu displayed when, for example, the user "right-clicks" within the page. In some embodiments, the ability to request the creation of a new field is limited based on access privileges of the user. That is, it will be appreciated that only a subset of users (e.g., database administrators) would typically be allowed to modify the structure of the database system.

Next, in step 206, device 102 displays a plurality of field creation options for database object 105. The field creation options might include, for example, field labels, field names, field types, and any other option traditionally provided for object fields. As noted briefly above, it is desirable that the field creation options are displayed within the user interface of the originally displayed page, not in a separate, back-end schema builder or field creation "wizard."

In accordance with further user interaction with the user interface, database system 104 receives a selection (114) of at least one of the plurality of field creation options (step 208). Database system then creates the field for database object 105 in database system 104 based on the selection (step 210) and provides a modified page (via signal 115) to device 102, which then displays (in step 212) the modified page including the newly created field for database object 105. Further modified pages may be provided (e.g., signal 116) in accordance with subsequent user interaction.

As will be appreciated, the various operational steps of method 200 may be implemented using a variety of software components and computer programming languages. In one embodiment, for example, the display and selection of field creation options (steps 206 and 208) are implemented via Javascript and/or CSS and HTML code reference by the page that is provided by database system 104 (e.g., through a web service). In other embodiments, Java, Actionscript, and like may be used.

FIGS. 3-7 depict, sequentially, the creation of a new field for a database object in accordance with an example user interface for a "pet store" database system. In that regard, the various user interface components (windows, frames, checkboxes) are not intended to be limiting.

Figure 3:
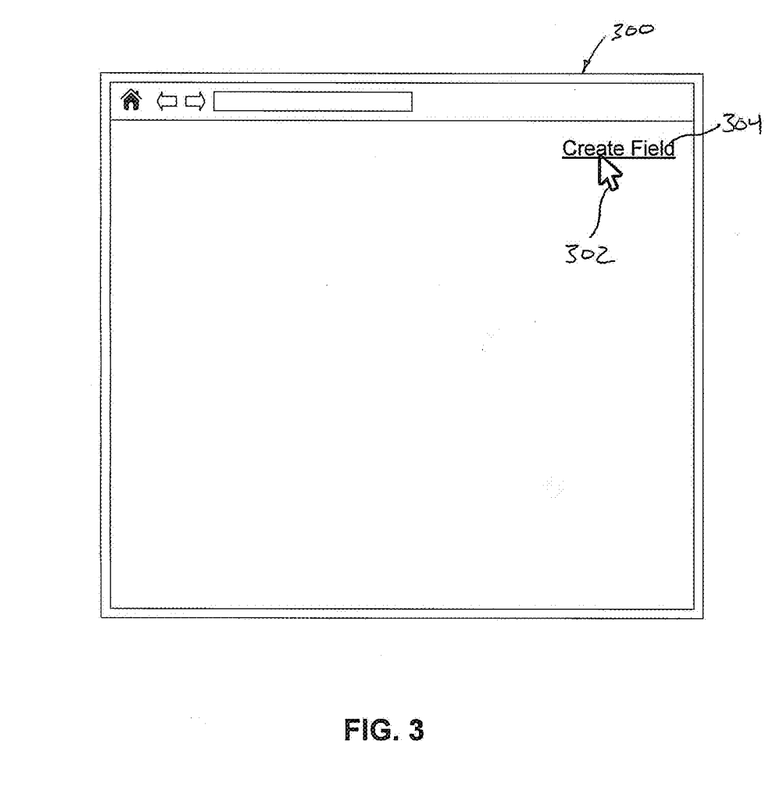
FIGS. 3-7 depict, sequentially, the creation of a new field on a page in accordance with an example embodiment.

FIG. 3 depicts a page 300 and user interface corresponding, in this example, to a web page rendered by a browser (e.g., a browser application executed by device 102 of FIG. 1). For the purpose of simplicity, page 300 is shown as being substantially empty; however, in a typical embodiment page 300 may already display a number of fields and associated data. Also illustrated in FIG. 3 is a hypertext link 304 labeled "Create Field" that may be activated (clicked) via a cursor 302. Activation of this link 302 then triggers the request to create a field (204 of FIG. 2). In another embodiment, a context menu (not shown) is presented at cursor 302 in response to a mouse "right click" event.

Figure 4:
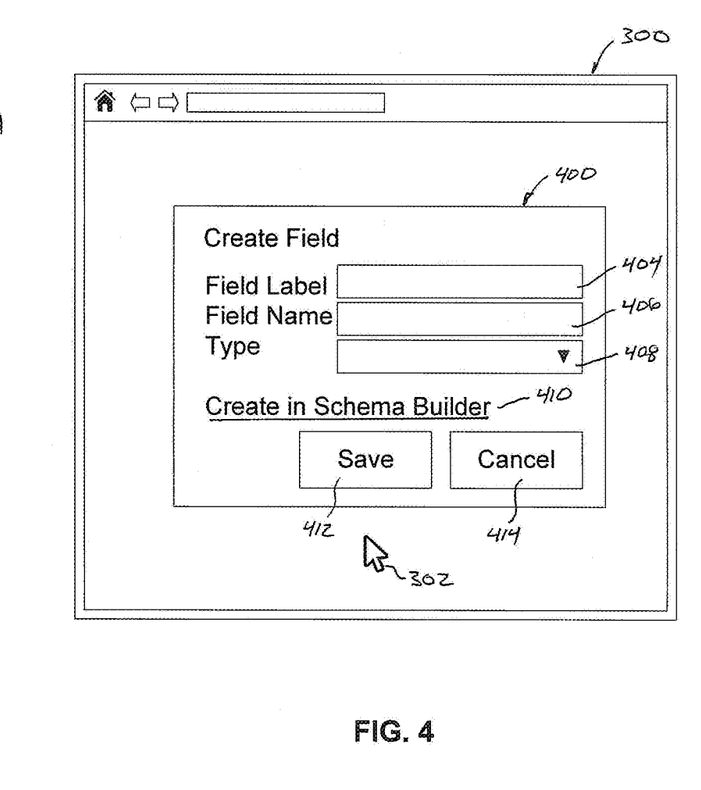

FIG. 4 depicts page 300 that, in response to the request to create a field, presents a window including various user interface components that allow the user to specify the relevant parameters of the new field. In particular, a number of field creation options are presented, such as field label 404, field name 406, and field type 408. Buttons 412 and 414 may be provided for saving and cancelling, respectively, creation of the new field. Furthermore, in accordance with the illustrated embodiment, the user may be given the choice (via link 410) of proceeding to a second user interface (e.g., a schema builder).

Field label 404 allows the user to enter a label (e.g., an alphanumeric string) for the new field that specifies how the field will be labeled on the modified page. Similarly, field name 406 allows the user to enter a name for the field (i.e., the name used for the field within the database object). Field type 408, in the illustrated embodiment, allows the user to specify the type of user interface element (e.g., checkbox, text, etc.) to be employed during data display and entry.

Figure 5:
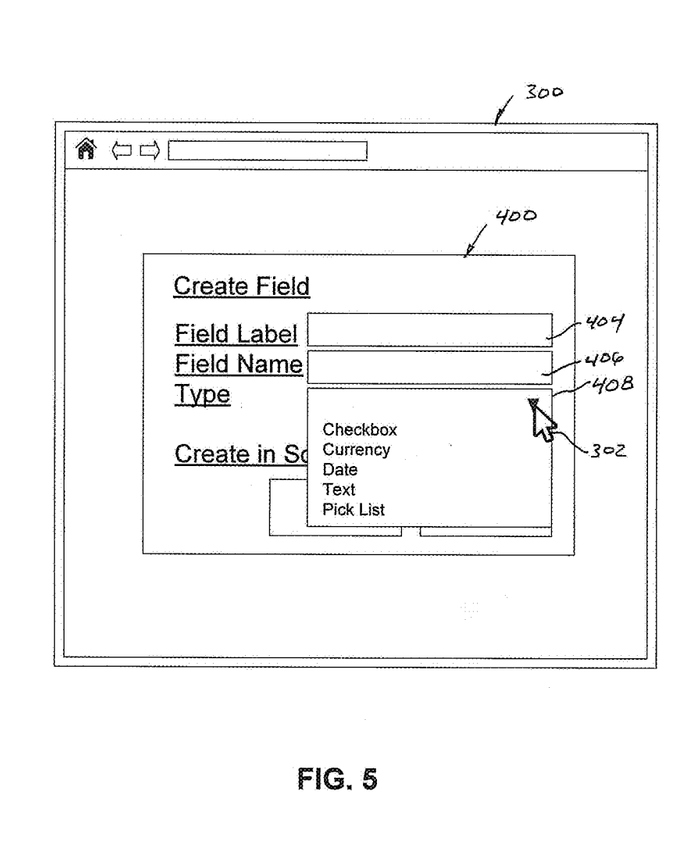
Figure 6:
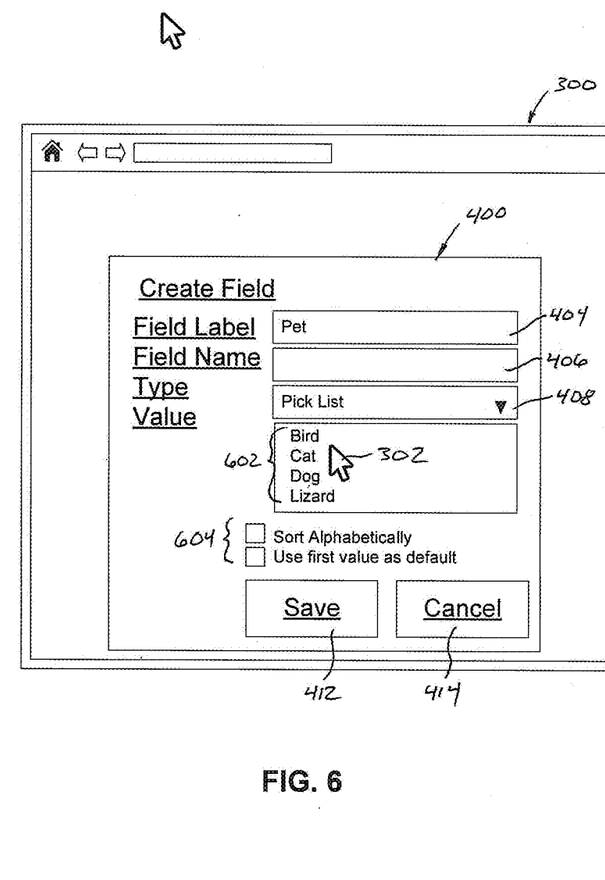

FIG. 5, for example, illustrates the case where a drop down menu for field type 408 is activated via cursor 302, thereby presenting a range of choices, such as "checkbox," "currency," "date," "text," and "pick list." FIG. 6 illustrates the result of the user entering "Pet" in the field label field 404 and selecting the "pick list" option for field type 408. Notably, additional field values 602 (e.g., "bird", "cat", etc.) are then displayed, one or more of which may be selected to build up a list of possible options. That is, the user creating the new field has specified that the field is to be labeled as a "pet" and has provide a range of values 602 that will ultimately be displayed by the (modified) page. Also illustrated in FIG. 6 are additional checkbox options 604 specifying, for example, whether the values 602 should be sorted alphabetically and/or whether the first value within list 602 ("bird," in this case) is to be used as a default.

It should be noted that the components displayed within 400 have been presented to the user "progressively." That is, instead of providing the user with an exhaustive list of all possible field types, values, etc., window 400 is populated only with those options that are appropriate to prior choices made by the user. The choices for values 602, for example, are only displayed after the "pick list" option was selected as field type 408. This significantly simplifies the creation of new fields compared to traditional back-end design tools.

Figure 7:
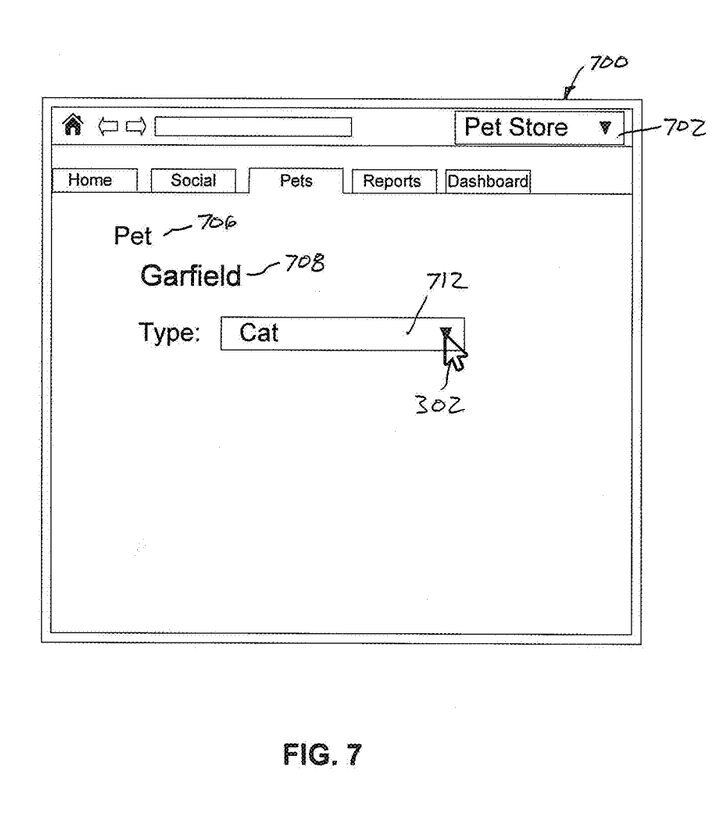

Finally, in FIG. 7, a modified page 700 including the newly-created field is displayed. In this figure, various tabs are shown along with a drop-down menu 702 that allows the particular application (in this case, a "Pet Store") to be selected. That is, FIG. 7 depicts a standard run-time use-case in which the user is adding new data to the database. In that regard, the field label ("Pet") (706) is displayed, and the user has entered the name "Garfield" (708) and selected "Cat" from the drop-down menu 712. As will be appreciated, the choices available within drop-down menu 712 were previously specified in FIG. 6 (via values 602).

Figure 8:
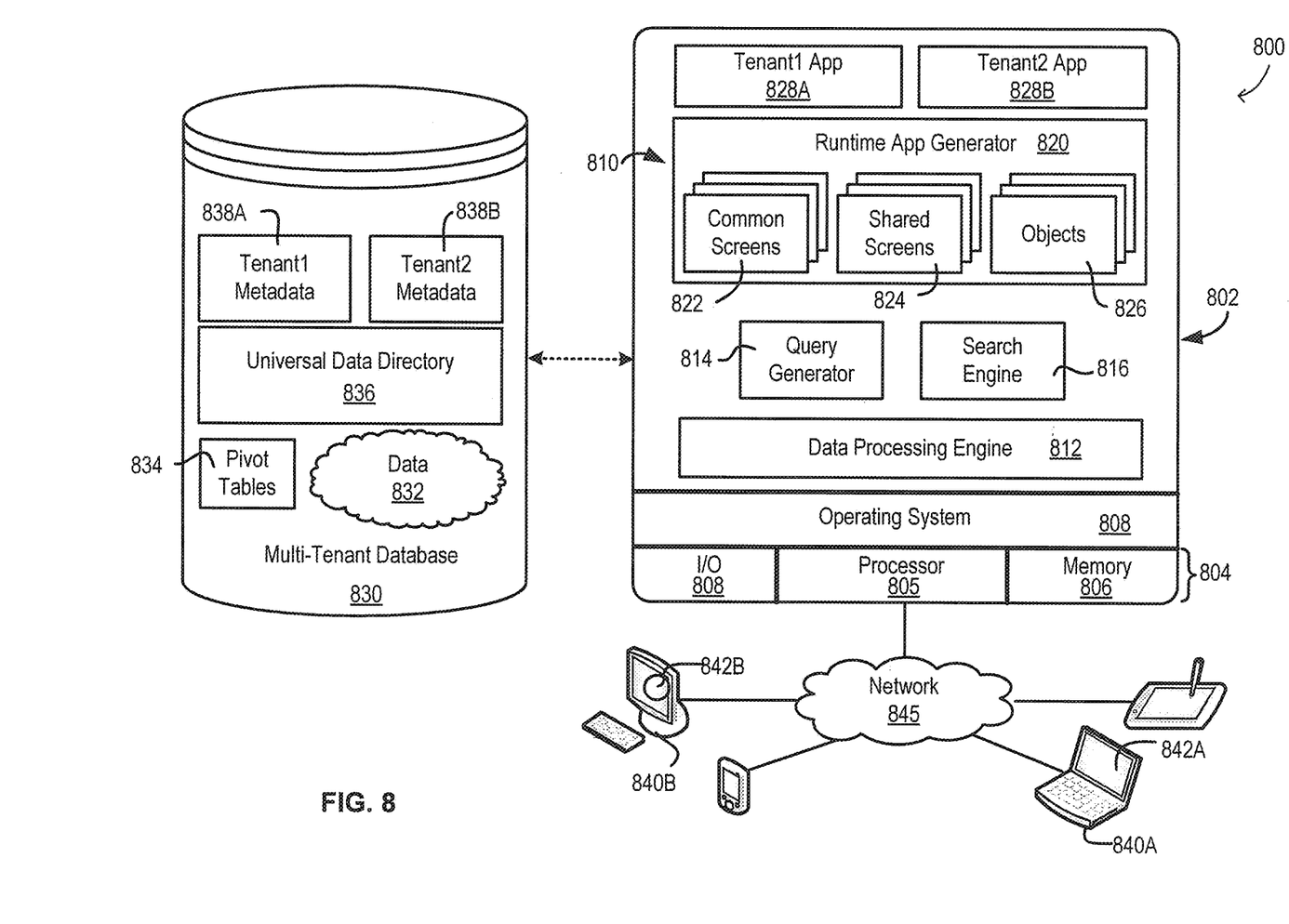
FIG. 8 depicts a method for creating a field in accordance with one embodiment.

FIG. 8 depicts an exemplary multi-tenant system suitable for implementation of the systems and methods described herein. That is, the various devices 804 may correspond to device 102 of FIG. 1, while the particular database objects 105 may be stored within multi-tenant database 830.

The illustrated multi-tenant system 800 of FIG. 8 includes a server 802 that dynamically creates and supports virtual applications 828 based upon data 832 from a common database 830 that is shared between multiple tenants, alternatively referred to herein as a multi-tenant database. Data and services generated by the virtual applications 828 are provided via a network 845 to any number of client devices 840, as desired. Each virtual application 828 is suitably generated at run-time (or on-demand) using a common application platform 810 that securely provides access to the data 832 in the database 830 for each of the various tenants subscribing to the multi-tenant system 800. In accordance with one non-limiting example, the multi-tenant system 800 is implemented in the form of an on-demand multi-tenant customer relationship management (CRM) system that can support any number of authenticated users of multiple tenants.

As used herein, a "tenant" or an "organization" should be understood as referring to a group of one or more users that shares access to common subset of the data within the multi-tenant database 830. In this regard, each tenant includes one or more users associated with, assigned to, or otherwise belonging to that respective tenant. To put it another way, each respective user within the multi-tenant system 800 is associated with, assigned to, or otherwise belongs to a particular tenant of the plurality of tenants supported by the multi-tenant system 800. Tenants may represent customers, customer departments, business or legal organizations, and/or any other entities that maintain data for particular sets of users within the multi-tenant system 800 (i.e., in the multi-tenant database 830). For example, the application server 802 may be associated with one or more tenants supported by the multi-tenant system 800. Although multiple tenants may share access to the server 802 and the database 830, the particular data and services provided from the server 802 to each tenant can be securely isolated from those provided to other tenants (e.g., by restricting other tenants from accessing a particular tenant's data using that tenant's unique organization identifier as a filtering criterion). The multi-tenant architecture therefore allows different sets of users to share functionality and hardware resources without necessarily sharing any of the data 832 belonging to or otherwise associated with other tenants.

The multi-tenant database 830 is any sort of repository or other data storage system capable of storing and managing the data 832 associated with any number of tenants. The database 830 may be implemented using any type of conventional database server hardware. In various embodiments, the database 830 shares processing hardware 804 with the server 802. In other embodiments, the database 830 is implemented using separate physical and/or virtual database server hardware that communicates with the server 802 to perform the various functions described herein. In an exemplary embodiment, the database 830 includes a database management system or other equivalent software capable of determining an optimal query plan for retrieving and providing a particular subset of the data 832 to an instance of virtual application 828 in response to a query initiated or otherwise provided by a virtual application 828. The multi-tenant database 830 may alternatively be referred to herein as an on-demand database, in that the multi-tenant database 830 provides (or is available to provide) data at run-time to on-demand virtual applications 828 generated by the application platform 810.

In practice, the data 832 may be organized and formatted in any manner to support the application platform 810. In various embodiments, the data 832 is suitably organized into a relatively small number of large data tables to maintain a semi-amorphous "heap"-type format. The data 832 can then be organized as needed for a particular virtual application 828. In various embodiments, conventional data relationships are established using any number of pivot tables 834 that establish indexing, uniqueness, relationships between entities, and/or other aspects of conventional database organization as desired. Further data manipulation and report formatting is generally performed at run-time using a variety of metadata constructs. Metadata within a universal data directory (UDD) 836, for example, can be used to describe any number of forms, reports, workflows, user access privileges, business logic and other constructs that are common to multiple tenants. Tenant-specific formatting, functions and other constructs may be maintained as tenant-specific metadata 838 for each tenant, as desired. Rather than forcing the data 832 into an inflexible global structure that is common to all tenants and applications, the database 830 is organized to be relatively amorphous, with the pivot tables 834 and the metadata 838 providing additional structure on an as-needed basis. To that end, the application platform 810 suitably uses the pivot tables 834 and/or the metadata 838 to generate "virtual" components of the virtual applications 828 to logically obtain, process, and present the relatively amorphous data 832 from the database 830.

The server 802 is implemented using one or more actual and/or virtual computing systems that collectively provide the dynamic application platform 810 for generating the virtual applications 828. For example, the server 802 may be implemented using a cluster of actual and/or virtual servers operating in conjunction with each other, typically in association with conventional network communications, cluster management, load balancing and other features as appropriate. The server 802 operates with any sort of conventional processing hardware 804, such as a processor 805, memory 806, input/output features 808 and the like. The input/output features 808 generally represent the interface(s) to networks (e.g., to the network 845, or any other local area, wide area or other network), mass storage, display devices, data entry devices and/or the like. The processor 805 may be implemented using any suitable processing system, such as one or more processors, controllers, microprocessors, microcontrollers, processing cores and/or other computing resources spread across any number of distributed or integrated systems, including any number of "cloud-based" or other virtual systems. The memory 806 represents any non-transitory short or long term storage or other computer-readable media capable of storing programming instructions for execution on the processor 805, including any sort of random access memory (RAM), read only memory (ROM), flash memory, magnetic or optical mass storage, and/or the like. The computer-executable programming instructions, when read and executed by the server 802 and/or processor 805, cause the server 802 and/or processor 805 to create, generate, or otherwise facilitate the application platform 810 and/or virtual applications 828 and perform one or more additional tasks, operations, functions, and/or processes described herein. It should be noted that the memory 806 represents one suitable implementation of such computer-readable media, and alternatively or additionally, the server 802 could receive and cooperate with external computer-readable media that is realized as a portable or mobile component or application platform, e.g., a portable hard drive, a USB flash drive, an optical disc, or the like.

The application platform 810 is any sort of software application or other data processing engine that generates the virtual applications 828 that provide data and/or services to the client devices 840. In a typical embodiment, the application platform 810 gains access to processing resources, communications interfaces and other features of the processing hardware 804 using any sort of conventional or proprietary operating system 808. The virtual applications 828 are typically generated at run-time in response to input received from the client devices 840. For the illustrated embodiment, the application platform 810 includes a bulk data processing engine 812, a query generator 814, a search engine 816 that provides text indexing and other search functionality, and a runtime application generator 820. Each of these features may be implemented as a separate process or other module, and many equivalent embodiments could include different and/or additional features, components or other modules as desired.

The runtime application generator 820 dynamically builds and executes the virtual applications 828 in response to specific requests received from the client devices 840. The virtual applications 828 are typically constructed in accordance with the tenant-specific metadata 838, which describes the particular tables, reports, interfaces and/or other features of the particular application 828. In various embodiments, each virtual application 828 generates dynamic web content that can be served to a browser or other client program 842 associated with its client device 840, as appropriate.

The runtime application generator 820 suitably interacts with the query generator 814 to efficiently obtain multi-tenant data 832 from the database 830 as needed in response to input queries initiated or otherwise provided by users of the client devices 840. In a typical embodiment, the query generator 814 considers the identity of the user requesting a particular function (along with the user's associated tenant), and then builds and executes queries to the database 830 using system-wide metadata 836, tenant specific metadata 838, pivot tables 834, and/or any other available resources. The query generator 814 in this example therefore maintains security of the common database 830 by ensuring that queries are consistent with access privileges granted to the user and/or tenant that initiated the request. In this manner, the query generator 814 suitably obtains requested subsets of data 832 accessible to a user and/or tenant from the database 830 as needed to populate the tables, reports or other features of the particular virtual application 828 for that user and/or tenant.

Still referring to FIG. 8, the data processing engine 812 performs bulk processing operations on the data 832 such as uploads or downloads, updates, online transaction processing, and/or the like. In many embodiments, less urgent bulk processing of the data 832 can be scheduled to occur as processing resources become available, thereby giving priority to more urgent data processing by the query generator 814, the search engine 816, the virtual applications 828, etc.

In exemplary embodiments, the application platform 810 is utilized to create and/or generate data-driven virtual applications 828 for the tenants that they support. Such virtual applications 828 may make use of interface features such as custom (or tenant-specific) screens 824, standard (or universal) screens 822 or the like. Any number of custom and/or standard objects 826 may also be available for integration into tenant-developed virtual applications 828. As used herein, "custom" should be understood as meaning that a respective object or application is tenant-specific (e.g., only available to users associated with a particular tenant in the multi-tenant system) or user-specific (e.g., only available to a particular subset of users within the multi-tenant system), whereas "standard" or "universal" applications or objects are available across multiple tenants in the multi-tenant system. For example, a virtual CRM application may utilize standard objects 826 such as "account" objects, "opportunity" objects, "contact" objects, or the like. The data 832 associated with each virtual application 828 is provided to the database 830, as appropriate, and stored until it is requested or is otherwise needed, along with the metadata 838 that describes the particular features (e.g., reports, tables, functions, objects, fields, formulas, code, etc.) of that particular virtual application 828. For example, a virtual application 828 may include a number of objects 826 accessible to a tenant, wherein for each object 826 accessible to the tenant, information pertaining to its object type along with values for various fields associated with that respective object type are maintained as metadata 838 in the database 830. In this regard, the object type defines the structure (e.g., the formatting, functions and other constructs) of each respective object 826 and the various fields associated therewith.

Still referring to FIG. 8, the data and services provided by the server 802 can be retrieved using any sort of personal computer, mobile telephone, tablet or other network-enabled client device 840 on the network 845. In an exemplary embodiment, the client device 840 includes a display device, such as a monitor, screen, or another conventional electronic display capable of graphically presenting data and/or information retrieved from the multi-tenant database 830. Typically, the user operates a conventional browser application or other client program 842 executed by the client device 840 to contact the server 802 via the network 845 using a networking protocol, such as the hypertext transport protocol (HTTP) or the like. The user typically authenticates his or her identity to the server 802 to obtain a session identifier ("SessionID") that identifies the user in subsequent communications with the server 802. When the identified user requests access to a virtual application 828, the runtime application generator 820 suitably creates the application at run time based upon the metadata 838, as appropriate. As noted above, the virtual application 828 may contain Java, ActiveX, or other content that can be presented using conventional client software running on the client device 840; other embodiments may simply provide dynamic web or other content that can be presented and viewed by the user, as desired.

The foregoing description is merely illustrative in nature and is not intended to limit the embodiments of the subject matter or the application and uses of such embodiments. Furthermore, there is no intention to be bound by any expressed or implied theory presented in the technical field, background, or the detailed description. As used herein, the word "exemplary" means "serving as an example, instance, or illustration." Any implementation described herein as exemplary is not necessarily to be construed as preferred or advantageous over other implementations, and the exemplary embodiments described herein are not intended to limit the scope or applicability of the subject matter in any way.

For the sake of brevity, conventional techniques related to on-demand applications, telephonic communication, conference call systems, and other functional aspects of the systems (and the individual operating components of the systems) may not be described in detail herein. In addition, those skilled in the art will appreciate that embodiments may be practiced in conjunction with any number of system and/or network architectures, data transmission protocols, and device configurations, and that the system described herein is merely one suitable example. Furthermore, certain terminology may be used herein for the purpose of reference only, and thus is not intended to be limiting. For example, the terms "first", "second" and other such numerical terms do not imply a sequence or order unless clearly indicated by the context.

Embodiments of the subject matter may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processing systems or devices can carry out the described operations, tasks, and functions by manipulating electrical signals representing data bits at accessible memory locations, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "processor-readable medium" or "machine-readable medium" may include any non-transitory medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like. In this regard, the subject matter described herein can be implemented in the context of any computer-implemented system and/or in connection with two or more separate and distinct computer-implemented systems that cooperate and communicate with one another. In one or more exemplary embodiments, the subject matter described herein is implemented in conjunction with a virtual customer relationship management (CRM) application in a multi-tenant environment.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application. Accordingly, details of the exemplary embodiments or other limitations described above should not be read into the claims absent a clear intention to the contrary.

What is claimed is:

1. A method for creating a field for a database object in a database system, the method comprising:
   prior to run-time:
   displaying, via a user interface presented on a display device, a first page associated with the database object;
   receiving, via the user interface presented on the display device, a request to create a field for the database object;
   in response to the request to create the field for the database object, displaying, via the user interface presented on the display device, a plurality of field creation options for creating fields for the database object within the first page;
   receiving, via the user interface presented on the display device, a selection of at least one of the plurality of field creation options;
   communicating the selection from the display device to the database system;
   creating the field for the database object in the database system based on the selection from the display device; and
   during run-time:
   sending the display device a second page to be displayed for adding new data to the database via an application generated at run-time during normal operation, via the same user interface presented on the display device that was displayed and used to receive the selection used to create the field without requiring the user to change to a second user interface, wherein the second page that includes the field for the database object that was created for the database object using the first page to allow the user to visualize how run-time results of creating the field for the database object are displayed during run-time, wherein the second page displayed during run-time is different than the first page that was displayed via the user interface and used to receive the selection used to create the field.

2. The method of claim 1, wherein the user interface presented on the display device is a web-based user interface and the first page is displayed via a web browser.

3. The method of claim 2, wherein the first page includes software instructions executable by the web browser to display the plurality of field creation options.

4. The method of claim 3, wherein the software instructions are Javascript software instructions.

5. The method of claim 1, wherein the database system is a multi-tenant system.

6. The method of claim 1, wherein the field creation options include at least a field type and a field name.

7. The method of claim 1, further including displaying, in response to the receipt of the request to create the field for the database object, a selectable option allowing creation of the field via a second user interface presented on the display device.

8. An apparatus comprising:
   a database system including a database object; and
   a computing device comprising a user interface presented on the computing device, the computing device being configured to:

display, via the user interface presented on the computing device prior to run-time, a first page associated with the database object;
send, to the database system prior to run-time, a request to create a field for the database object;
in response to the request to create the field for the database object:
display, via the user interface presented on the computing device prior to run-time, a plurality of field creation options for creating fields for the database object within the first page;
receive, via the user interface presented on the computing device prior to run-time, a selection of at least one of the plurality of field creation options; and
communicate the selection from the computing device to the database system prior to run-time;
wherein the database system is configured to create the field for the database object in the database system based on the selection from the display device; and
wherein the computing device is sent a second page to be displayed for adding new data to the database via an application generated at run-time during normal operation, during run-time, via the same user interface presented on the computing device that was displayed and used to receive the selection used to create the field without requiring the user to change to a second user interface, wherein the second page includes the field for the database object that was created for the database object using the first page to allow the user to visualize how run-time results of creating the field for the database object are displayed during run-time, and wherein the second page to be displayed during run-time is different than the first page that was displayed via the user interface and used to receive the selection used to create the field.

9. The apparatus of claim 8, wherein the user interface presented on the computing device is a web-based user interface and the page is displayed via a web browser running on the computing device.

10. The apparatus of claim 9, wherein the first page includes software instructions executable by the web browser to display the plurality of field creation options.

11. The apparatus of claim 10, wherein the software instructions are Javascript software instructions.

12. The apparatus of claim 8, wherein the database system is a multi-tenant system.

13. The apparatus of claim 8, wherein the field creation options include at least a field type and a field name.

14. The apparatus of claim 8, wherein the computing device is configured to display, in response to the receipt of the request to create the field for the database object, a selectable option allowing creation of the field via a second user interface presented on the computing device.

15. A non-transitory machine-readable medium including instructions for creating a field for a database object in a database system, which instructions, when executed by a processor, causes the processor to perform the steps of:
prior to run-time:
displaying, via a user interface of a computing device, a first page associated with the database object;
receiving, via the user interface presented on the computing device, a request to create a field for the database object;
in response to the request to create the field for the database object, displaying, via the user interface presented on the computing device, a plurality of field creation options for creating fields for the database object within the first page;
receiving, via the user interface presented on the computing device, a selection of at least one of the plurality of field creation options;
communicating the selection from the computing device to the database system;
creating the field for the database object in the database system based on the selection from the computing device; and
during run-time:
sending the computing device a second page to be displayed for adding new data to the database via an application generated at run-time during normal operation, via the same user interface presented on the computing device that was displayed and used to receive the selection used to create the field without requiring the user to change to a second user interface, wherein the second page that includes the field for the database object that was created for the database object using the first page to allow the user to visualize how run-time results of creating the field for the database object are displayed during run-time, and wherein the second page displayed during run-time is different than the first page that was displayed via the user interface and used to receive the selection used to create the field.

16. The non-transitory machine-readable medium of claim 15, wherein the user interface presented on the computing device is a web-based user interface and the first page is displayed via a web browser.

17. The non-transitory machine-readable medium of claim 16, wherein the first page includes software instructions executable by the web browser to display the plurality of field creation options.

18. The non-transitory machine-readable medium of claim 17, wherein the software instructions are Javascript software instructions.

19. The non-transitory machine-readable medium of claim 15, wherein the database system is a multi-tenant system.

20. The non-transitory machine-readable medium of claim 15, wherein the field creation options include at least a field type and a field name.

* * * * *